Figure 1:
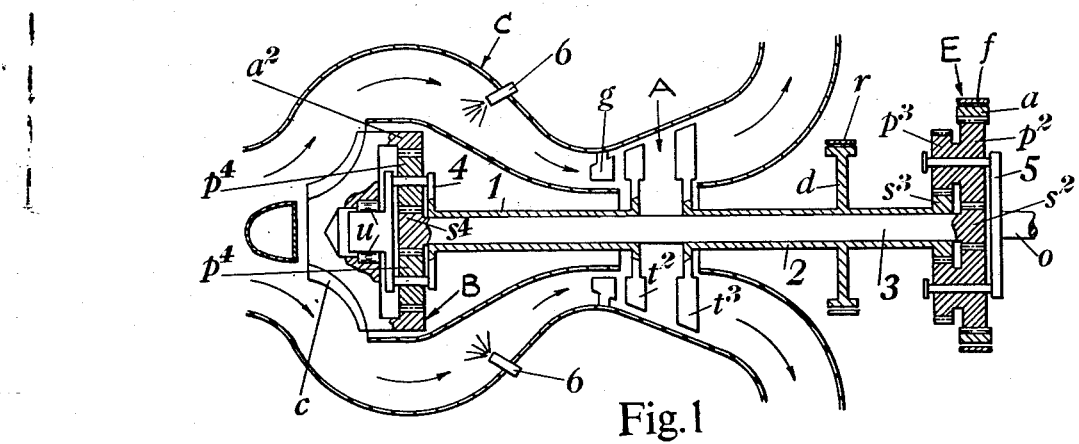

United States Patent Office 2,981,063
Patented Apr. 25, 1961

2,981,063
VARIABLE SPEED POWER TRANSMISSION MECHANISMS
Axel Charles Wickman, 14 S. Hibiscus Drive, Hibiscus Island, Miami Beach, Fla.
Filed June 16, 1958, Ser. No. 742,176
Claims priority, application Great Britain June 17, 1957
3 Claims. (Cl. 60—39.16)

This invention has for its primary object to provide in a simple and convenient form automatically variable power transmission mechanisms for use with road or other vehicles.

In its broadest aspect the invention comprises in combination a gas turbine having at least two independently rotatable rotors arranged in series, an output shaft, a rotary air compressor, a combustion chamber from which motive gas is supplied to the turbine under the action of the air compressor, a first epicyclic mechanism connecting at least one of the turbine rotors to the output shaft, and a second epicyclic mechanism connecting the air compressor to another of the turbine rotors, the second epicyclic mechanism having a reaction member connected to the first epicyclic mechanism.

Further objects and advantages of the invention will be apparent from the following detailed description and annexed drawings.

Figure 2:
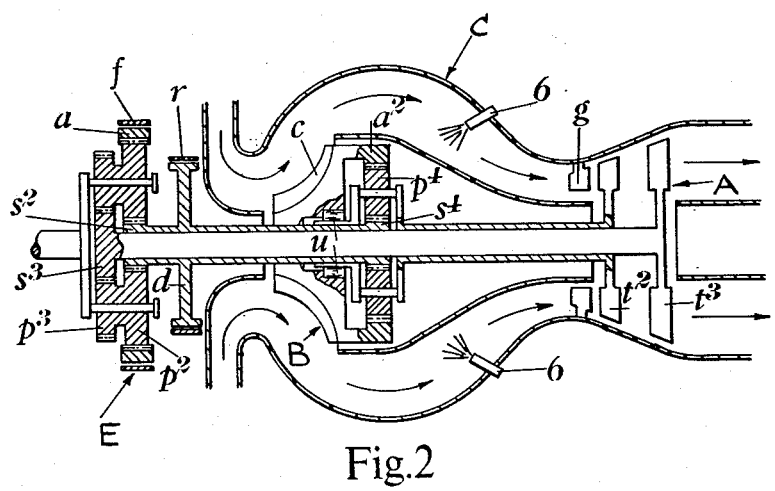

In the drawings:

Figure 1 is a diagrammatic showing of an embodiment of the invention, and Figure 2 diagrammatically illustrates a variation of the arrangement shown in Figure 1.

Referring to Figure 1, the legend A denotes generally a gas turbine, and B a rotary air compressor under the action of which motive gas is supplied to the turbine from a combustion chamber C.

The turbine A is provided with two adjacent rotors $t2$ and $t3$, and a guide vane or blade $g$ is located between the rotor $t2$ and the combustion chamber C, the latter being provided with fuel injection nozzles 6. Also, the compressor B has combined therewith an epicyclic overdrive mechanism comprising a sun pinion $s4$ on a shaft 3, planet pinions $p4$ engaging the sun pinion and mounted on a carrier 4 connected to the turbine rotor $t2$ by a sleeve 1 on the shaft, and an internally toothed annulus $a2$ engaging the planet pinions and formed on or secured to the compressor rotor $c$. The sun pinion $s4$ of the epicyclic overdrive mechanism is connected by the shaft 3 to a sun pinion $s2$ of another epicyclic mechanism E, and the turbine rotor $t3$ is connected by a second sleeve 2 on the shaft 3 to another sun pinion $s3$ of the last mentioned epicyclic mechanism, the sun pinion $s3$ being of larger diameter than the sun pinion $s2$. The epicyclic mechanism E includes one or more pairs of interconnected planet pinions $p2$ and $p3$ of different diameters which respectively engage the sun pinions $s2$ and $s3$, and which are mounted on a carrier 5 connected to a power output shaft $o$.

The larger planet pinions $p2$ engage an internally toothed annulus $a$ which is normally held against rotation by a band-type friction brake $f$. On the sleeve 2 inter-connecting the rotor $t3$ and the sun pinion $s3$ is formed or secured a brake disc $d$ which can be held against rotation by a band-type friction brake $r$.

For forward drive of the vehicle, the annulus $a$ is held by the brake $f$ with the brake $r$ in its released condition, and for reverse drive of the vehicle, the brake $f$ is released and the disc $d$ is held by the brake $r$.

When the fuel control valve (not shown) of the combustion chamber is opened the turbine rotor $t2$ rapidly accelerates the compressor B through the associated epicyclic overdrive mechanism, and as the reaction member, that is the sun pinion $s4$, of this epicyclic mechanism is connected to the output shaft $o$ through the other epicyclic mechanism E, the reaction torque created by rotation of the compressor immediately accelerates the vehicle. Moreover, under idling conditions the compressor is kept at a higher speed than the turbine rotor $t2$.

When the speed of the rotor $t3$ equals that of the rotor $t2$, the output shaft $o$ is driven at the same speed.

Essentially, the embodiment shown in Figure 2 is similar to that shown in Figure 1 and differs mainly in that the compressor B is located between the epicyclic mechanism E and the turbine rotors $t2$ and $t3$. In operation this embodiment is similar to that shown in Figure 1.

In each of the embodiments shown the turbine rotor $t2$ is connected to the compressor rotor $c$ through a unidirectional clutch $u$ so that when the vehicle overruns the engine, that is, when the vehicle drives the output shaft $o$, the compressor B and the turbine rotor $t2$ are driven at the same speed due to the unidirectional clutch.

From the foregoing description, it will be appreciated that in each embodiment, the turbine includes at least two rotors arranged in series with no guide vanes arranged between adjacent rotors so that there is free gas communication between the adjacent rotors. By virtue of the operative connections between the turbine rotors and the epicyclic mechanisms, there is provided a stepless gear ratio between the turbine and the output shaft.

The invention is not, however, restricted to the examples above described, as it may be embodied in other equivalent forms.

Having thus described my invention what I claim as new and desire to secure by Letters Patent is:

1. An automatically variable power transmission mechanism comprising in combination, a gas turbine having at least two independently rotatable rotors arranged in series, an output shaft, a rotary air compressor, a combustion chamber from which motive gas is supplied to the turbine under the action of the air compressor, a first epicyclic mechanism connecting at least one of the turbine rotors to the output shaft, and a second epicyclic overdrive mechanism connecting another of the turbine rotors to the air compressor, the second epicyclic mechanism having a reaction member connected to the first epicyclic mechanism.

2. A mechanism as claimed in claim 1, in which a sun pinion forming a part of the first epicyclic mechanism is connected to another sun pinion forming the reaction member of the second epicyclic mechanism.

3. An automatically variable power transmission mechanism comprising in combination, a gas turbine having at least two independently rotatable rotors arranged in series, a rotary air compressor, a combustion chamber from which motive gas is supplied to the turbine under the action of the air compressor, an output shaft, an epicyclic overdrive mechanism and a unidirectional clutch connecting one of the turbine rotors to the air compressor, and another epicyclic mechanism for transmitting motion from the other of the turbine rotors to the output shaft and including at least two sun pinions of different diameters one of which is connected to another sun pinion forming a part of the first mentioned epicyclic overdrive mechanism and the other of which is connected to the last mentioned rotor of the turbine, a planet pinion carrier on the output shaft, planet pinions of different diameters mounted on the carrier and engaging the associated sun pinions, a brake-controlled internally toothed annulus engaging the planet pinions of larger diameter, and a reversing brake associated with one of the last mentioned sun pinions.

References Cited in the file of this patent

UNITED STATES PATENTS

| | | |
|---|---|---|
| 2,149,785 | Neugebauer | Mar. 7, 1939 |
| 2,702,985 | Howell | Mar. 1, 1955 |
| 2,852,912 | Kelley | Sept. 23, 1958 |

FOREIGN PATENTS

| | | |
|---|---|---|
| 759,606 | Great Britain | Oct. 24, 1956 |